Figure 1:
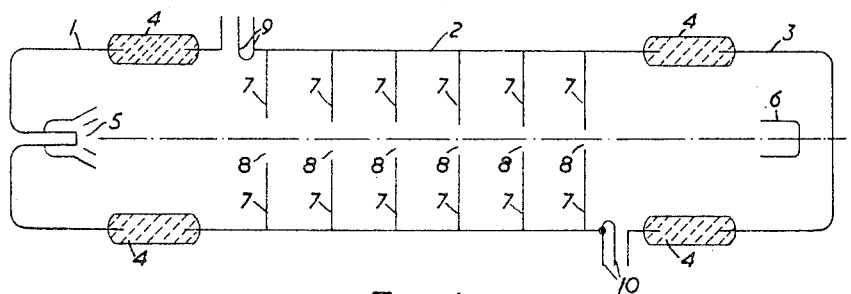

central apertures vary in size

INVENTOR
Neville Wreford Harris
BY
Baldwin & Wright
ATTORNEYS

3,274,428
TRAVELLING WAVE TUBE WITH BAND PASS SLOW WAVE STRUCTURE WHOSE FREQUENCY CHARACTERISTIC CHANGES ALONG ITS LENGTH
Neville Wreford Harris, Great Baddow, Essex, England, assignor to English Electric Valve Company Limited, London, England, a British company
Filed Apr. 1, 1963, Ser. No. 269,388
2 Claims. (Cl. 315—3.6)

This invention relates to travelling wave tubes and has for its object to provide improved travelling wave tubes adapted for use in amplifiers and which shall be such as to offer less liability to self-oscillation, when so used, than known comparable travelling wave tubes. More specifically the invention, which is applicable to both forward wave travelling wave tubes and to backward wave travelling wave tubes, relates to the slow wave structure employed in travelling wave tubes having band-pass characteristics.

As is well known, the slow wave structure in a travelling wave tube having a band pass characteristic is excited by radio frequency energy the frequency of which is within the pass band of the said structure, said energy being amplified by interaction with an electron beam which travels along the structure at a speed which is approximately the same as that of the fundamental or one of the space harmonic waves of the radio frequency electromagnetic field pattern set up in the structure. A typical band pass structure consists of a series of elements or cells, such for example as resonant cavities, which are coupled to constitute an iterative structure. In some cases all the cells are identical; in others adjacent cells are of different resonant frequencies in cycle repeated sequences e.g. $f_1\ f_2\ f_1\ f_2\ f_1\ f_2$ or $f_1\ f_2\ f_3\ f_1\ f_2\ f_3$ where $f_1\ f_2$ and $f_3$ are different resonant frequencies. In a simple structure of identical cells the phase shift $\theta_n$ per cell of the individual electro-magnetic waves can be expressed by the equation $$\theta_n = \theta + 2n\pi$$

where $n$ is the harmonic number and may be zero or a positive or negative integer and $\theta$ is the phase shift per cell of the fundamental wave and may have any value between 0 and $\pi n$ radians. The pass band of the structure lies between the frequency for which $\theta=0$ (the zero-mode cut off) and the frequency for which $\theta=\pi$ (the $\pi$-mode cut off). Other forms of band pass structure are, of course, known in travelling wave tubes. In a forward wave tube the waves travel along the structure in the same direction as that of the electrons in the electron beam, input signals to be amplified being applied at or near that end of the structure nearer the electron gun and amplified output being taken off at or near the other end; in a backward wave tube the waves travel along the structure in the opposite direction to that of electron travel, the amplified output being taken off at or near the end of the structure nearer the gun and input signals being fed in at or near the other end. The present invention is applicable to all travelling wave tubes, whether of the forward or backward wave type, having band pass slow wave structures.

A serious difficulty experienced with known travelling wave tubes with band pass slow wave structures is that of providing over the whole frequency range good impedance matching at the input transformer or other impedance matching connections employed for feeding in the input signals and taking off the amplified output. The difficulty is greatest in frequencies near the band pass cut-off frequencies. Usual practice is to provide as good impedance matching as possible near the middle of the pass band but known tubes, when used for high gain amplification, have a marked tendency to burst into self-oscillation at certain frequencies in the pass band—and in particular at frequencies near the cut-off frequencies—as a result of energy reflection from the ends of the structure caused by poor impedance matching to the input and output connections. The trouble is worst near the cut-off frequencies because here the impedance of the slow wave structure changes most rapidly with frequency. With a forward wave tube self-oscillation is most apt to occur near the higher frequency cut-off and with a backward wave tube it is most liable to occur near the lower frequency cut off. The present invention seeks to overcome or reduce this difficulty.

According to a feature of this invention a travelling wave tube has a band pass slow wave structure including different portions with different cut-off frequencies said structure being so formed and dimensioned and said cut-off frequencies being so chosen that waves of a frequency near a predetermined limit of the pass band cannot propagate along the full length of the structure.

According to another feature of the invention the characteristics of the slow wave structure of a travelling wave tube having a band-pass slow wave structure are varied along the length of said structure in such manner that the cut-off frequency of a predetermined portion of said structure nearer the electron gun of the tube lies outside the pass band of the remaining portion of said structure towards the end thereof away from said gun.

Preferably in the case of a forward wave tube the structure is such that the higher frequency cut-off of the structure portion away from the gun is below the higher frequency cut off of the other portion and preferably, in the case of a backward wave tube, the structure is such that the lower frequency cut off of the structure portion away from the gun is above the lower frequency cut off of the other portion.

The variation of the structure characteristics may be effected in a single step, the structure portions on each side of the step having different characteristics but each having uniform characteristics along its own length. Preferably, however, the variation is effected gradually over the whole length of the structure or at any rate over a large portion of that length.

The invention achieves its objects because energy at a frequency near to the cut-off frequency at which self-oscillation is most apt to occur is substantially prevented from propagating along the whole length of the slow wave structure and thus cannot interact strongly with the electron beam. Accordingly the liability for self-oscillations at and near this frequency is much reduced.

One known form of forward wave travelling wave tube comprises an electron gun, a collector electrode positioned to receive the electrons of an electron beam projected from said gun, and intermediate between the gun and the collector electrode, a series of partition members each transverse to the electron beam path and each having a hole positioned to pass said beam, said holes reducing in size from partition member to partition member from a maximum size in a partition member nearer the gun to a minimum size in a partition member nearer the collector electrode.

One form of backward wave travelling wave tube in accordance with this invention comprises an electron gun, a collector electrode positioned to receive the electrons of an electron beam projected from said gun, and intermediate between the gun and the collector electrode, a series of partition members transverse to the electron beam path and each having a main hole positioned to pass said beam, all said main holes being aligned, and a further aperture which is offset with respect to the main hole, all said further apertures being aligned with an alignment substantially parallel to the main hole alignment, the further apertures reducing in size from partition member to partition member from a maximum size in a partition member nearer the collector electrode to a minimum size in a partition member nearer the gun. The aligned further apertures may conveniently be slots the lengths of which are reduced from partition member to partition member.

Figure 2:
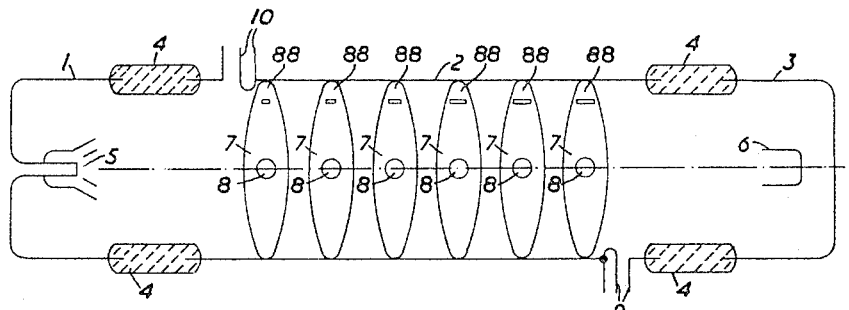
Figure 3:
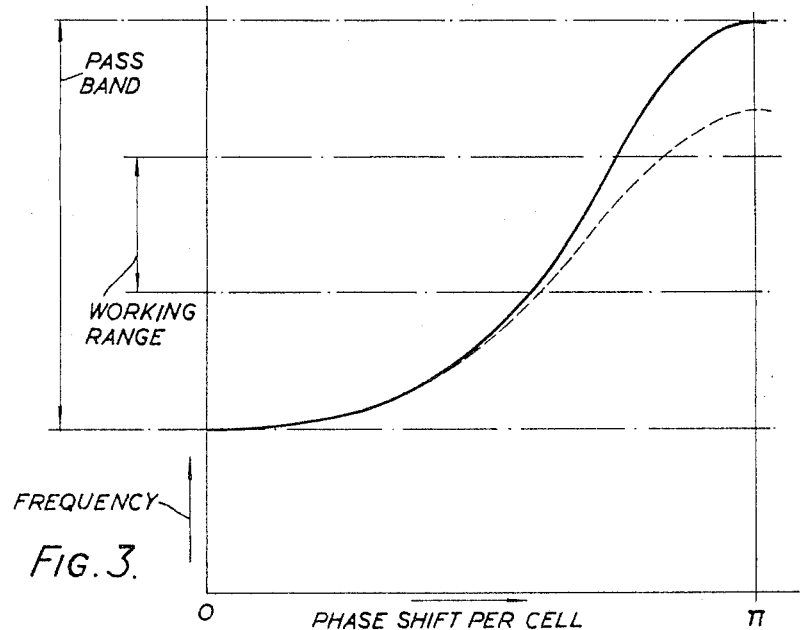
Figure 4:
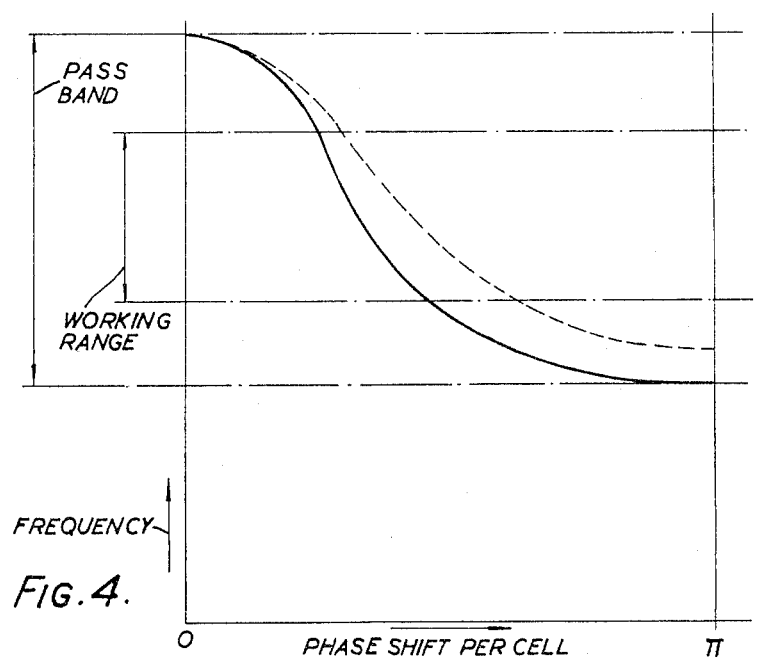

The invention is illustrated in and further explained in connection with the accompanying drawings in which FIG. 1 is a simplified diagrammatic representation of a known form of forward wave travelling wave tube; FIG. 2 represents a backward wave travelling wave tube in accordance with the invention; and FIGS. 3 and 4 are explanatory graphical figures. In FIG. 2 the partition discs are represented in perspective in order better to show their construction. Like references denote like parts in FIGS. 1 and 2.

Referring to FIG. 1 the tube therein shown has a cylindrical envelope consisting of three co-axial metal envelope parts 1, 2 and 3 joined by glass "beads" 4 in the usual way. In the envelope part 1 is an electron gun 5 directed towards a collector electrode 6 in the part 3. Between the gun 5 and the collector 6 is a series of disc-like transverse metal partitions 7—six are shown in the illustrated embodiment—with aligned central holes 8 positioned to pass the beam which is represented by the chain line. The holes 8 are not of the same size but are of diminishing size, reducing from member to member with the largest hole in the member nearest the gun and the smallest hole in the member nearest the collector. The dimensions of the slow wave structure constituted by the partitions and which is a wave guide structure consisting of resonant cavity cells coupled to one another to constitute a band pass iterative structure, are so chosen that a wave of frequency near the high frequency end of the pass band substantially cannot propagate along the full length of the line. This choice is effected by so choosing, in accordance with known design principles, the dimensions of the holes 8 that the higher frequency cut-off of the latter portion of the structure nearer the collector, e.g. the last third of the length of the structure is below the higher frequency cut-off of the earlier portion of the structure e.g. the first two-thirds of the length thereof. Input signals to be amplified are fed in by a co-axial line 9 arranged in known manner as shown and amplified output is taken off by a similarly arranged co-axial line 10.

The example of the invention as illustrated in backward wave tube shown in FIG. 2 requires little further description. The input line 9 is, of course, at the collector end of the slow wave structure and the out-put line 10 at the other end. The partition discs 7 have aligned central holes 8 all of the same size and slots apertures 88 which are also aligned and have an alignment parallel to that of the holes 8. The slots 88 which are parallel to one another, have their directions of length substantially at right angles to disc radii and are of different lengths, reducing from partition to partition, with the longest slot in the partition nearest the collector and the shortest slot in the partition nearest the gun. These slots are so dimensioned that a wave of frequency near the low frequency end of the band pass substantially cannot propagate along the full length of the structure, the lower frequency cut-off, say the last third of the structure nearer the collector being above the lower frequency cut-off of the remaining portion of the structure.

The invention is not limited to the particular embodiments shown but is applicable to all amplifier travelling wave tubes having band-pass slow wave structures.

In FIGURE 3 frequency is plotted as ordinates against phase shift per cell as abscissae to show propagation characteristics of a band-pass wave structure in an amplifier travelling wave tube of the nature of that illustrated by FIGURE 1. The phase shift per cell is a function of frequency and also of the position in the structure of the cell considered. The full line curve of FIGURE 3 typifies the phase shift per cell for a cell near the gun end of the structure while the broken line curve similarly typifies the phase shift per cell for a cell near the other end of the said structure. FIGURE 4 is a similar graphical figure for a backward wave tube of the nature of that shown in FIGURE 2, the full line curve illustrating the propagation characteristics of the slow wave structure at the collector end thereof and the broken line curve illustrating the propagation characteristics of said structure towards the gun end thereof. In both figures the pass band is indicated as also is the working range which would normally be adopted.

I claim:

1. A backward wave travelling wave tube having an electron gun, a collector electrode positioned to receive the electrons of an electron beam projected from said gun, and intermediate between the gun and the collector electrode, a series of partition members transverse to the electron beam path and each having a main hole positioned to pass said beam, all said main holes being aligned, and a further aperture which is offset with respect to the main hole, all said further apertures being aligned with an alignment substantially parallel to the main hole alignment, the further apertures reducing in size from partition member to partition member from a maximum size in a partition member nearer the collector electrode to a minimum size in a partition member nearer the gun.

2. A backward wave travelling wave tube as claimed in claim 1 wherein the aligned further apertures are slots the lengths of which are reduced from partition member to partition member.

References Cited by the Examiner

UNITED STATES PATENTS 2,895,071 7/1959 Kompfner _____ 315—3.6
3,068,425 12/1962 Boutet et al. _____ 315—3.6 X HERMAN KARL SAALBACH, *Primary Examiner.*

ELI LIEBERMAN, *Examiner.*

R. D. COHEN, *Assistant Examiner.*

UNITED STATES PATENT OFFICE
CERTIFICATE OF CORRECTION

Patent No. 3,274,428                            September 20, 1966

Neville Wreford Harris

It is hereby certified that error appears in the above numbered patent requiring correction and that the said Letters Patent should read as corrected below.

In the heading to the printed specification, after "line 9" insert -- Claims priority, application Great Britain, June 29, 1962, 25,077/62 --.

Signed and sealed this 22nd day of August 1967.

(SEAL)
Attest:

ERNEST W. SWIDER                          EDWARD J. BRENNER
Attesting Officer                              Commissioner of Patents